A. E. JOHNSON.
TRANSMISSION MECHANISM.
APPLICATION FILED SEPT. 12, 1916.
1,304,484.
Patented May 20, 1919.
2 SHEETS—SHEET 1.
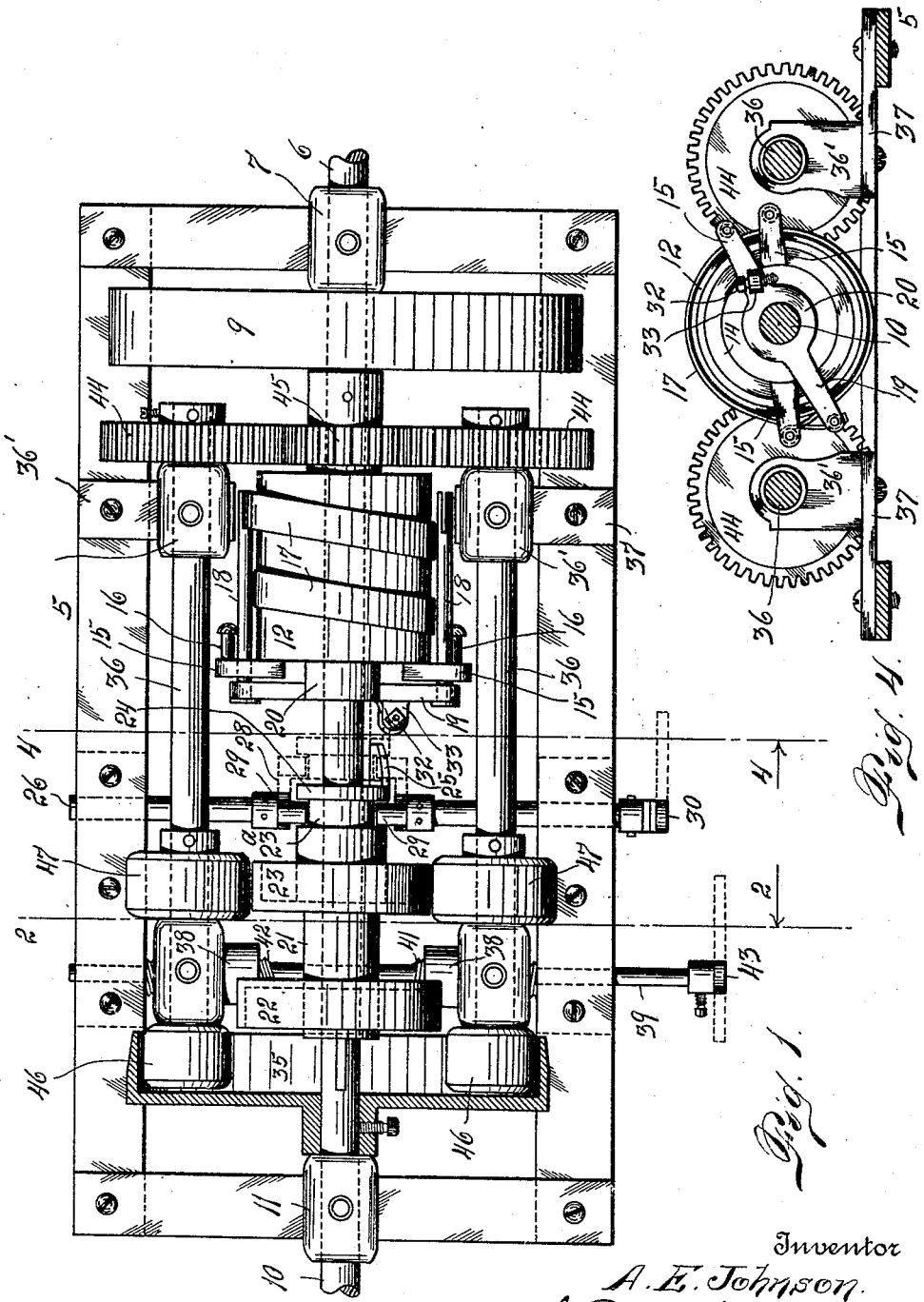
Inventor
A. E. Johnson.
By
Attorney

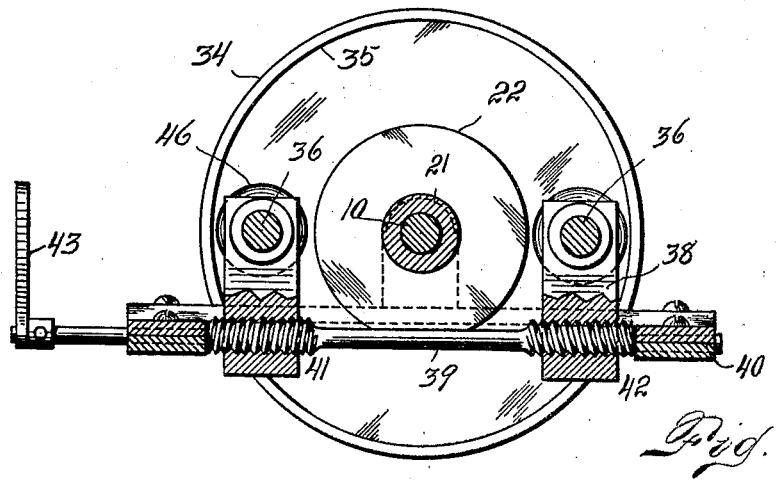
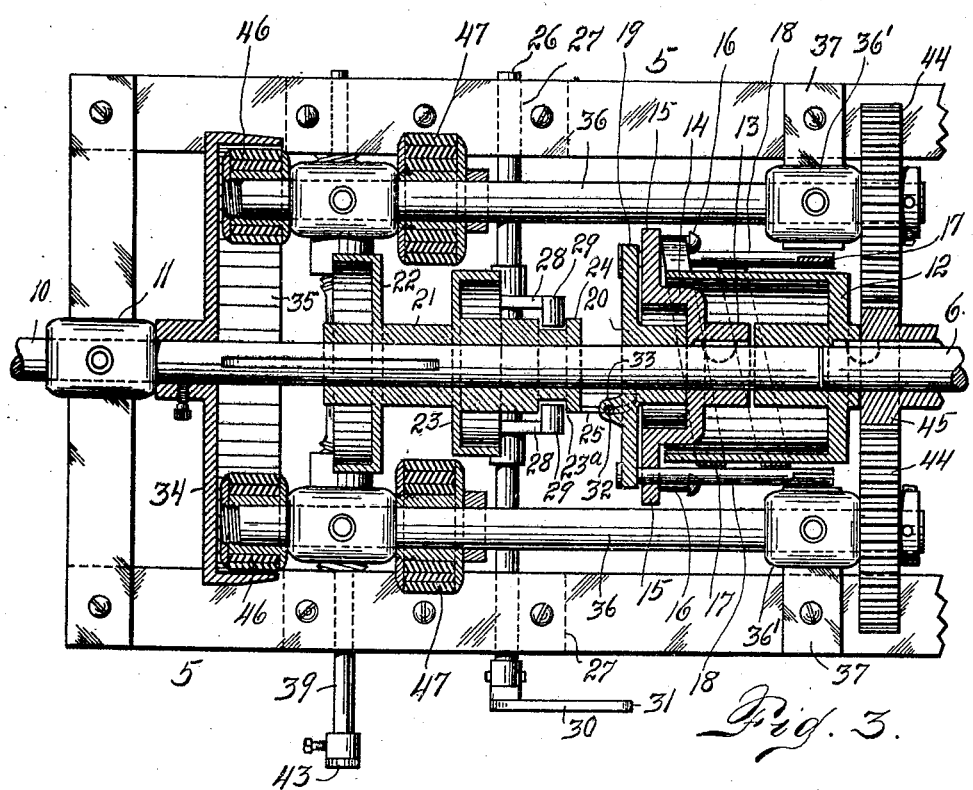

UNITED STATES PATENT OFFICE.

ALFRED E. JOHNSON, OF DENVER, COLORADO.

TRANSMISSION MECHANISM.

1,304,484.     Specification of Letters Patent.     Patented May 20, 1919.

Application filed September 12, 1916. Serial No. 119,664.

*To all whom it may concern:*

Be it known that I, ALFRED E. JOHNSON, citizen of the United States, residing at the city and county of Denver and State of Colorado, have invented certain new and useful Improvements in Transmission Mechanisms; and I do declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates to improvements in power transmission and pertains more particularly to that type of transmission in which the different speeds are produced by alternately interposing frictional devices of varying peripheral areas between the several driving and the driven members respectively.

The invention has for its principal object the provision of an improved form of power transmission of the type above referred to which will be applicable to all machines where it is desired to change the speed of the driven member and reverse the direction of travel of the same. One use for which the present invention is particularly well suited is on automobiles where it is so essential that the means for changing the speed of the driving wheels be absolutely reliable and capable of ready and easy manipulation.

The invention further contemplates the provision of improved clutch and friction members for connecting and releasing the several moving shafts and elements.

With these and other objects which will be apparent as the description is proceeded with the invention consists in the combination and arrangement of parts more fully set forth in the following specification, illustrated in the accompanying drawings and more particularly pointed out in the appended claims:

In the drawings—

Figure 1 is a top plan view of the invention, with parts shown in section.

Fig. 2 is a vertical section taken on the line 2—2 of Fig. 1 looking in the direction of the arrow.

Fig. 3 is a horizontal section through the apparatus taken approximately on the line 3—3 of Fig. 2, and Fig. 4 is a vertical section taken on the line 4—4 of Fig. 1 looking in the direction of the arrow.

Referring now to the drawing, the several parts of the mechanism are shown carried in a rectangular frame 5, which may be the chassis of an automobile or the supporting structure of any machine to which the invention is applied.

Power is applied through any suitable source (not shown) to the driving shaft 6 journaled in bearings 7 and 8 and having keyed thereto the usual fly wheel 9. A driven shaft 10 is mounted in a bearing 11 at the opposite end of the frame and extends inwardly in the same horizontal alinement with the drive shaft 6. A drum clutch is provided between the driving and driven shafts and consists of a hollow cup-shaped member 12 keyed to the inner end of the drive shaft 6 and adapted to rotate therewith. The inner end of the driven shaft 10 has fixed thereto a collar 13, the hub of which extends within the drum member 12 and is keyed to the inner extremity of said shaft. This collar 13 is formed with an annular shoulder or offset portion 14 from which a pair of oppositely disposed lugs 15 extend at right angles to the axis of the shaft and are adapted to project slightly beyond the outer surface of the drum member 12. Pins 16 are provided in the lugs or extensions 15 and to one of these pins is secured the end of a coiled leaf spring 17 which spring is spirally wrapped about the drum 12 for two or three convolutions and has its opposite end secured to and carried by a rod 18. This rod 18 is one of a pair of parallel rods carried at the outer extremity of a cross bar 19 which is provided with a hub 20 loosely carried on the driven shaft 10 and extending within the annular recess of the member 14. The cross bar 19 is thus freely mounted on the shaft 10 but its limit of circumferential movement thereon is restricted by the spiral spring 17. Slidably carried on the shaft 10 beyond the clutch is a sleeve 21 having a pair of frictional disks 22 and 23 formed integral therewith and suitably spaced from one another. The inner end of this sleeve is also provided with an annular groove 23ª, and a collar 24 at the end nearest the clutch member just described. Extending horizontally from the collar 24 is a cam-shaped ear or lug 25. A transverse shaft 26 is pivotally mounted in bearings 27 to the under part of the frame and is further provided with a pair of arms 28 rigidly carried thereon and having at their upper ends lips 29 adapted to enter the groove 23ª from opposite sides. At one end of the shaft 26 a lever 30 is provided terminating in an operating handle 31. By moving this handle back and forth the shaft 26 is turned about its pivots and the arms 28 engaging the recessed collar 24 cause the sleeve 21 with its friction disks 22 and 23 to slide along the driven shaft 10. As the sleeve 21 is moved to the right the cam extension 25 engages with a set screw 32 carried in a lug 33 formed integrally with the cross bar 19. As the end of the cam surface of the lug 25 contacts with the end of the set screw 32 the latter is caused to move up the surface of the cam and in so doing the cross bar 19 with its hub is turned about the shaft 10 until the spiral spring 17 is clamped tightly to the outer surface of the drum 18. It will thus be seen that when the parts are in this position motion imparted to the driving shaft 6 will, through the drum clutch just described, be transmitted directly to the driving shaft 10.

Near the opposite end of the driven shaft 10 a large wheel 34 is provided being pinned to the shaft so as to rotate therewith. This wheel 34 has an inner frictional surface 35 by means of which it is adapted to be driven as will hereinafter appear. A pair of parallel shafts 36 are suitably mounted on either side of the driving and driven shafts 6 and 10 being equally spaced therefrom. These shafts are supported at one end in journal boxes 36' which are pivotally carried at their under sides on brackets 37 secured to opposite sides of the frame 5. Near their opposite ends these shafts are journaled in a pair of brackets 38 which are supported on a transverse shaft 39 having bearings 40 at the under side of the frame. The shaft 39 is provided with oppositely disposed double threaded worm portions 41 and 42 which engage correspondingly internally threaded portions of the brackets 38. An operating lever 43 is fixedly secured to the outer end of the shaft 39 and as this lever is moved to the right or to the left the shaft 39 is given a partial rotation whereby the brackets 38 will be caused to move outwardly or inwardly according to the direction in which the lever is turned. The shafts 36 are each provided with a gear wheel 44 at their inner extremities adapted to mesh continually with an intermediate gear 45 fixed to the driving shaft 6. At the opposite extremities of the shafts 36 small frictional wheels 46 are provided, adapted to normally extend within the inner surface of the friction wheel 34. A second set of slightly larger frictional wheels 47 are similarly carried on the shafts 36 at the opposite side of the brackets 38 these latter being adapted to engage at times with the smaller friction wheel 23 carried on the sleeve 21. The outer friction wheels 46 are of such diameter that their inner peripheral surfaces may be caused to contact with the outer surface of the friction wheel 22 or their outer surfaces may be caused to contact with the inner frictional surface 35 of the large wheel 34.

According to the present construction it is possible to transmit the power from the driving shaft 6 to the driven shaft 10 and secure three different speeds for the latter shaft in a forward direction and a single speed for the same shaft in the reverse direction. In order to drive the shaft 10 forwardly at its lowest speed the lever handle 31 is moved to the left in Fig. 1 causing the sleeve 21 to slide along the driven shaft 10 until the friction wheel 22 is within the circumference of the large friction wheel 34. The lever 43 is then moved to the right causing the two small frictional wheels 46 to move inwardly and to be clamped against the outer surface of the wheel 22. It will thus be seen that power applied to shaft 6 is imparted to the two parallel shafts 36 through the gears 44 and 45 and the motion of these shafts through the friction wheels 46 is frictionally imparted to the outer surface of the wheel 22 and this being splined on the shaft 10 carries the latter with it at the same speed. In order to drive the parts forward at the second speed the lever 43 is operated to move the friction wheels 46 away from the outer surface of the friction disk 22. The lever 30 is then moved to the right causing the sleeve 21 to slide along the shaft 10 until the similar friction disk 23 is in alinement with the friction wheels 47 when the lever 43 is again moved to the right causing the friction wheels 47 to be clamped against the outer periphery of the wheel 23. The motion now imparted to the driving shaft 6 will, as before, be transmitted through the gears 44 and 45 to the shafts 36 and the wheels 47 will drive the friction disk 23 causing the shaft 10 to move at a higher rate of speed than in the former instance. In order to drive the shaft 10 forwardly at the highest rate of speed the lever 43 is operated to place both sets of friction wheels 46 and 47 in a neutral position, i. e. in the position shown best in Fig. 3 where they do not frictionally engage any of the driven members. The lever 30 is then moved to the right causing the sleeve 21 to slide along the shaft 10 until the cam 25 engages and moves the cross bar 19 tightening the coiled spring 17 and locking the member carried on the inner end of the driven shaft 10 with the drum 12 which is rigidly carried on the driving shaft 6. Motion now imparted to shaft 6 will be directly transmitted to shaft 10, the parts being coupled as shown through the clutch mechanism just described. If it is desired to drive the shaft 10 in the reverse direction the sleeve 21 is moved to the left so as to disengage the clutch and at the same time the lever 43 is moved to the extreme left causing the brackets 38 to move outwardly away from the center shaft 10 until the small friction wheels 46 are clamped into frictional engagement with the inner surface 35 of the large wheel 34. Power now applied to driving shaft 6 is transmitted through gear wheels 44 and 45, shafts 36 and small friction wheels 46 to the inner periphery of the large friction wheel 34 with the result that the speed of the shaft 10 is materially reduced and the direction of its travel is reversed.

It will be understood that in order to vary the different speeds at which the driven member is to be rotated it is only necessary to vary the size of the different friction members and this can be done without in any way departing from the spirit of the invention.

Having described my invention what I claim is:

1. Power transmission mechanism comprising a driving shaft, a driven shaft, a member having an internal friction surface fixedly secured to said driven shaft, a second member slidably carried on said driven shaft and having an external friction surface, and friction means operable through said driving shaft for imparting movement to either of said friction surfaces to produce different speeds.

2. Power transmission means comprising a driving shaft, a driven shaft, clutch mechanism for directly connecting said shafts with each other, a friction wheel fixedly secured to said driven shaft, a friction wheel non-rotatably carried on said driven shaft, and friction means operable through said driving shaft for imparting rotary motion to said driven shaft through any of said friction wheels when the clutch is inoperative, said friction wheels being of sizes to give different speeds in connection with said friction means.

3. Power transmission means comprising a driving shaft, a driven shaft, a member having an internal friction surface keyed to said driven shaft, a second member slidably carried thereon and having a pair of external friction surfaces of varying size and friction means operable through said driving shaft for imparting rotary movement to either of said external surfaces to produce different speeds in one direction and for imparting rotary movement to the internal surface for producing a still different speed in the reverse direction.

4. Power transmission means comprising a driving shaft, a driven shaft, clutch mechanism for directly coupling the said shafts, a friction wheel fixedly secured to said driven shaft, a second member comprising a pair of integral friction wheels non-rotatably carried on said driven shaft, and friction means operable through said driving shaft for imparting rotary motion to the driven shaft through any of said friction wheels.

5. Power transmission means comprising a driving shaft, a driven shaft, clutch mechanism for directly coupling the said shafts, a wheel having an inner friction surface, said wheel being keyed on said driven shaft, a member slidably carried on said shaft and having two external friction surfaces of different circumference, and a friction driving member operable through said driving shaft, comprising a pair of parallel shafts each provided with a pair of spaced friction wheels adapted to contact with the said frictional surfaces for imparting rotary movement.

In testimony whereof I affix my signature, in presence of two witnesses.

ALFRED E. JOHNSON.

Witnesses:
CHAS. E. PARSONS,
HELEN A. VILLEMAGNE.

Copies of this patent may be obtained for five cents each, by addressing the "Commissioner of Patents, Washington, D. C."